United States Patent [19]

Outlaw

[11] Patent Number: 4,690,724
[45] Date of Patent: Sep. 1, 1987

[54] ELECTRICALLY HEATED DECAL STRIPPING TOOL

[76] Inventor: William F. Outlaw, P.O. Box 1255, Rocky Mount, N.C. 27801

[21] Appl. No.: 855,811

[22] Filed: Apr. 24, 1986

[51] Int. Cl.⁴ ............................................. B32B 31/18
[52] U.S. Cl. ...................................... 156/584; 30/140; 30/169; 156/344; 219/229; 219/230; 219/233; 219/238
[58] Field of Search ............... 30/140, 169; 156/344, 156/584; 219/229, 230, 233, 238

[56] References Cited

U.S. PATENT DOCUMENTS

| | | | |
|---|---|---|---|
| 1,192,389 | 7/1916 | Chandler | 219/229 |
| 2,014,196 | 9/1935 | Raffles | 219/530 |
| 2,074,629 | 3/1937 | Ungar | 219/238 X |
| 2,324,148 | 7/1943 | Gravin | 30/140 |
| 2,470,194 | 5/1949 | Terry | 219/230 |
| 2,600,067 | 6/1952 | Merodian | 30/140 X |
| 2,620,692 | 12/1952 | Marshall | 219/221 X |
| 2,763,170 | 9/1956 | Karem | 219/221 X |
| 3,045,336 | 7/1962 | Northrup et al. | 219/221 |
| 3,524,045 | 8/1970 | Siegel | 219/238 X |
| 3,673,383 | 6/1972 | Sofia | 219/227 |
| 3,752,017 | 8/1973 | Lloyd et al. | 219/221 X |
| 4,055,744 | 10/1977 | Fortune | 219/239 |
| 4,074,110 | 2/1978 | Slaughter | 219/240 |

Primary Examiner—Robert A. Dawson
Attorney, Agent, or Firm—Richard E. Jenkins

[57] ABSTRACT

A portable decal stripping tool particularly adapted for the quick removal of adhesive decals from an automotive surface and comprising a decal stripper attachment for a soldering iron including an elongate shaft with a head portion secured thereto adapted to removably engage and support a razor blade. The decal stripper attachment is constructed of heat conductive material which facilitates elevation of the temperature of the razor blade secured therein so that it will slide under and remove a decal by melting the adhesive securing it to an automobile surface or the like.

1 Claim, 5 Drawing Figures

ELECTRICALLY HEATED DECAL STRIPPING TOOL

DESCRIPTION

1. Technical Field

The present invention relates to an apparatus for stripping decals or the like from a surface to which they have been adhesively secured. More particularly, the present invention provides a removable attachment for a conventional electrical soldering iron which allows the soldering iron to be utilized to strip a decal from an automobile or other surface to which it has been adhesively secured. The heated blade of the decal stripping tool serves to heat the adhesive under the decal as it is pushed under the decal and thereby removes the decal without scratching or otherwise damaging the surface to which the decal has been applied.

2. Background Art

The prior art discloses a number of soldering irons or related electrically heated hand held implements having attachments or replaceable tips for serving a variety of purposes. For example, U.S. Pat. No. 2,620,692 to Marshall, III discloses an electrically heated wire stripping tool comprising a soldering iron and a removable wire stripping head having a V-shaped notch defined therein. U.S. Pat. No. 2,074,629 to Ungar discloses a soldering iron particularly adapted for the ready interchange of various tip elements. U.S. Pat. No. 1,192,389 to Chandler discloses an electrically heated hand implement having a removable heated scraping tool at the end thereof for finishing, smoothing, scraping or burning off old varnish, paint and the like. Also, an insulation stripping attachment for soldering irons is disclosed in U.S. Pat. No. 2,763,170 to Karem. The heated attachment is slidably mounted on the soldering iron tip which includes a pair of V-shaped notches which serve to melt and strip plastic insulation from a conductor wire. Other patents of possible interest are U.S. Pat. No. 3,045,336 to Northrop et al., U.S. Pat. No. 3,673,383 to Sofia and U.S. Pat. No. 3,524,045 to Siegel.

In view of this prior art, it can be seen that it is known to utilize a removable heated tip with an electrically heated soldering iron. However, there does not appear to be any prior art directed to an electrically heated decal stripping tool constructed so as to facilitate the removal of decals from an automobile or other object without damaging the surface underlying the decal.

DISCLOSURE OF THE INVENTION

In accordance with the present invention, applicant provides an electrically heated decal stripping tool designed specifically for removing a decal from an automobile or other object in a simple and expeditious fashion without any damage to the surface of the object to which the decal has been applied. This is accomplished with a removable heat conductive attachment for a soldering iron which is particularly adapted to slidably receive and elevate the temperature of a razor blade. In this fashion, the heated blade of the decal stripping tool heats the adhesive under a decal as the blade slides between the decal and the surface to which it is applied in order to remove it. Thus, a decal may be efficiently removed from an automobile or other surface without scratching or otherwise damaging the surface area under the decal.

An object of the present invention is therefore to provide an apparatus for stripping decals from an automobile or other object with ease and without damaging the surface underlying the decal.

Another object of the present invention is to provide a relatively inexpensive decal stripping tool which is adapted for use with a conventional soldering iron.

Still another object of the present invention is to provide a portable decal stripping tool particularly adapted for quickly removing pin stripes, decals or the like from an automobile surface more quickly and safely than has heretofore been possible.

DESCRIPTION OF THE DRAWINGS

Some of the objects of the invention having been stated, other objects will become evident as the description proceeds, when taken in connection with the accompanying drawings in which.

BEST MODE FOR CARRYING OUT THE INVENTION

Figure 1:
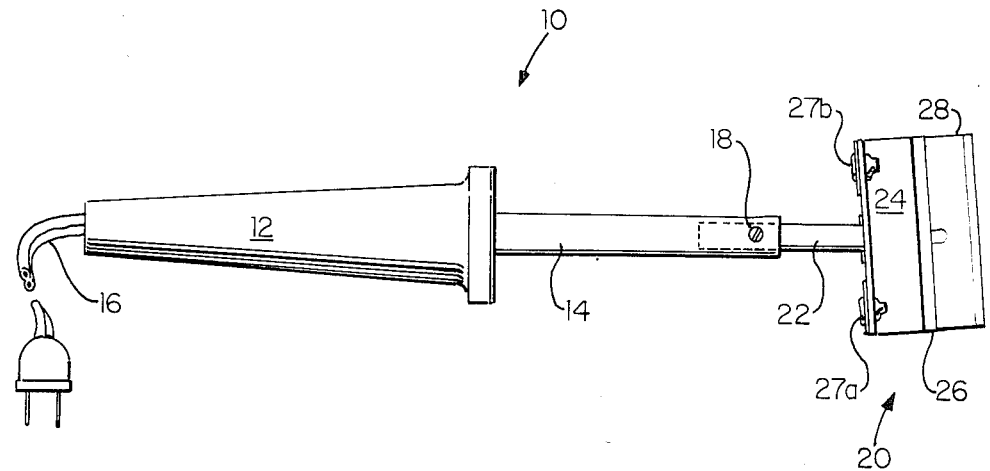
FIG. 1 is a top plan view of one embodiment of the present invention in which the novel decal stripping tool is attached to a conventional soldering iron.

Referring now to the drawings, FIG. 1 shows an electrically heated decal stripping tool, generally designated 10, comprising a conventional soldering iron having a handle 12, a barrel 14 and an electric cord 16. Although any suitable conventional soldering iron will work, applicant has found a WELLER 40 watt, 120 volt soldering iron to be particularly effective. As shown in FIG. 1, barrel 14 has an opening at the end thereof and set screw 18 so that the decal stripper attachment, generally designated 20, may be inserted into barrel 14 and locked into place by set screw 18.

Figure 2:
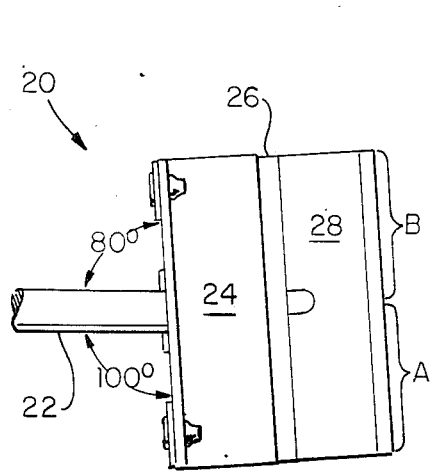
FIG. 2 is a top view of the decal stripping head.
Figure 3:
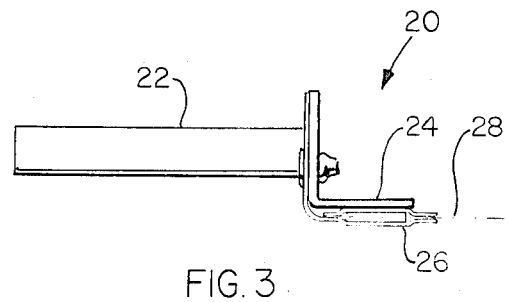
FIG. 3 is side elevation view of the decal stripping head.
Figure 4:
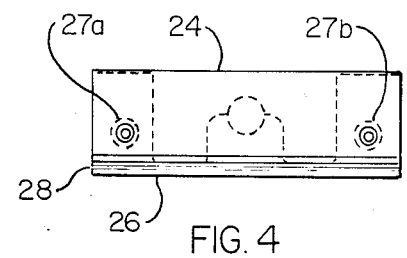
FIG. 4 is front end view of the decal stripping head.
Figure 5:
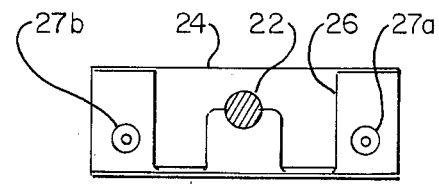
FIG. 5 is a rear end view of the decal stripping head of the present invention.

Decal stripper attachment 20 comprises elongate shaft 22 which is secured to support base 24 which carries fixedly secured razor blade retainer 26. Retainer 26 is secured to support base 24 with rivets 27A, 27B (see FIGS. 4 and 5). Finally, as best seen in FIG. 3, retainer 26 slidably receives single edge razor blade 28 within its spring-loaded jaws. With particular reference now to FIG. 2, it should be appreciated that the preferred embodiment of decal stripper attachment 20 provides for support base 24 and blade retainer 26 to be secured to elongate shaft 22 so that the longitudinal axis of the support base 24 and blade retainer 26 is not at a perpendicular angle to the longitudinal axis of elongate shaft 22. This allows the cutting edge of razor blade 28 to have a cutting portion A which contacts a decal before cutting portion B in order to better function to peal an adhesively adhered decal from the underlying surface. Preferably, the offset of support base 24 and blade retainer 26 from a precise perpendicular orientation with elongate shaft 22 is about 10 degrees as may best be appreciated with reference again to FIG. 2.

Although any suitable heat conductive metal will be satisfactory, applicant's preferred embodiment of his invention contemplates that elongate shaft 22 comprises stainless steel and support base 24 comprises copper. Blade retainer 26 is formed of spring steel in order to most effectively receive and retain single edge razor blade 28. Therefore, it can be appreciated that decal stripper attachment 20 will conduct heat from soldering iron barrel 14 to the cutting edge of razor blade 28 in a most efficient and effective manner. This allows razor blade 28 to heat the adhesive under a decal as the cutting edge of the blade is pushed thereunder in order to quickly and easily remove the decal without damage to the surface thereunder.

Although the electrically heated decal stripping tool of the invention is particularly suited for the removal of pin stripes and other decals from an automobile without scratching the underlying painted metal surface, the tool may also be used to remove adhesive labels or stickers from new appliances and for other related applications which the user may find appropriate.

In operation, electrically heated decal stripping tool 10 is first plugged into an electrical outlet and allowed to heat for about 3 to 5 minutes in order that razor blade 28 of decal stripper attachment 20 becomes sufficiently elevated in temperature. Next, if an automobile pin stripe or other decal is to be removed quickly and without scratching the paint of the underlying surface, the cutting edge of razor blade 28 is slowly inserted under the decal so that the elevated temperature of blade 28 melts the adhesive between the decal and the surface thereunder and blade 28 may be freely pushed under the decal to quickly and efficiently remove it. Electrically heated decal stripping tool 10 will therefore tend to more freely slide under decals and pin stripes which have been adhered to an automobile surface for an extended period of time and remove them without scratching the paint beneath the decal.

It has also been found that if an electrical receptacle is not in close proximity to the work station, decal stripping tool 10 may be initially plugged in and heated for 5 to 8 minutes at a convenient location and then unplugged and taken to the location where the work is to be performed. Decal stripping tool 10 will maintain a working temperature for a period of several minutes after it is unplugged and thereby enable decal removal to be performed without tool 10 being plugged into an electrical outlet.

It will be understood that various details of the invention may be changed without departing from the scope thereof. Furthermore, the foregoing description is for the purpose of illustration only, and not for the purpose of limitation—the invention being defined by the claim.

What is claimed is:

1. A heat conductive decal stripper attachment for a portable soldering iron of the type having a handle and a barrel and comprising:
    an elongate base adapted to be removably secured to said barrel so that the longitudinal axis thereof will be substantially coaxial with that of said barrel; and
    an elongate head portion affixed thereto so that the longitudinal axis of said head portion is substantially perpendicular to that of said base, said head portion comprising biased clamping means for replaceably engaging and supporting a single edge razor blade with the blade thereof positioned at the outermost operative end of said soldering iron.

* * * * *